United States Patent Office 3,256,096
Patented June 14, 1966

3,256,096
ANABOLIC STIMULATOR AS A POULTRY FEED SUPPLEMENT
Eli Jordan Tucker, Jr., Houston, Tex., assignor, by mesne assignments, to Organic Nutrients, Inc., Houston, Tex., a corporation of Texas
No Drawing. Filed Aug. 11, 1961, Ser. No. 130,786
1 Claim. (Cl. 99—4)

This invention relates to an anabolic stimulator as a poultry feed supplement which, when fed to poultry at the rate of say one gram per fowl per day, will appreciably stimulate the rate of growth and weight increase, and which will also substantially eliminate the tendency of the fowls toward cannibalism or the eating of the flesh of other fowls to compensate for diet deficiency, as deficiency in abrasive material taken into the craw and which enhances digestive action therein.

As a primary object the invention sets out to provide an anabolic stimulator as a poultry feed supplement which will increase the rate of growth and weight increase in poultry to which the supplement is fed.

It is also an important object of the invention to provide a poultry feed supplement of this class which will eliminate the tendency of fowls toward cannibalism or the eating of the flesh of other fowls to compensate for diet deficiency in abrasive material taken into the craw and which enhances digestive action therein.

It is a further object of this invention to provide a poultry feed supplement of this class which is easily and inexpensively prepared, and which may be preserved at full strength until fed to poultry.

It is also an object of this invention to provide a feed supplement of this class adapted to be fed to birds of all species, and to other animals, and not necessarily to poultry exclusively, with the result that anabolism is stimulated where the feed supplement is fed.

Broadly, in practicing the invention, freshly butchered bovine skeleton bone is sliced, cut and screened to particulate size, mixed with a liposcopic or fat absorbing agent which absorbs the fat, as marrow fat, from the particles, and the resultant product is then mixed with a coating material as calcium carbonate ($CaCO_3$) to coat each particle while the remaining mixture of fat swollen liposcopic material and coating material serves as the particle suspending agent and as a valued part of the food supplement.

In preparing the supplement, freshly butchered bovine bone is employed as the first element processed, the marrow of the bone to provide the fat component of the mixture. The bone may be cut transversely into workable lengths, as say six (6") inch lengths, and then a length may be sliced longitudinally, as by a conventional revolving saw, into strips, as strips averaging approximately one-half (½") inch wide by say one-fourth (¼") inch thick.

The strips are fed into a cutting machine in which the blades reduce the bone to particle size in cooperation with a screen having perforations therein of approximately one fourth (¼") inch diameter, the screen being of such thickness and the blades being set to revolve in such proximity to the inner face of the screen, that the particles are forced out or extruded through the perforations with limiting dimension being approximately one fourth (¼") inch in diameter and say one half (½") inch in length. In the process of reducing the bone to particle size any fat, as marrow fat, which has not been wiped off in butchering and slicing or left residually in the cutting machine, is carried through in those bone particles which retain marrow when cut, or which otherwise have marrow thereon by virtue of association with marrow bearing particles during the cutting process.

The bone particles, including the marrow fat therein and carried along therewith, have added thereto a liposcopic material, as cottonseel meal, in weight about one-ninth of the weight of the bone particles with marrow fat included, so that the components of the total mixture at this point are in the proportions of liposcopic materials 10% to bone and marrow fat 90%. This mixture is now placed in a centrifugal mixer and mixed and stirred until substantial uniformity of admixture is obtained. The bone particles and the liposcopic material with the marrow absorbed therein, are then about equal in volume due to the cottonseed meal having absorbed fat and being resultantly swollen.

As is well known, cottonseed meal is a very dry, highly moisture absorbent material, and it thus has the characteristics for absorbing a moist material such as fat. A thorough mixture, as by an automatic stirring machine, will thus result in the liposcopic material as cottonseed meal absorbing practically all of the fat or marrow, leaving the bone particles comparatively dry. Thus only enough moisture may be left thereon to insure that a coating material, as will be described hereinbelow, may adhere thereto.

The mixture of bone particles carrying marrow mixed with the liposcopic material is now further mixed with a coating material such as calcium carbonate which is added in weight ratio of from 10% to 20% to the total weight which is thus respectively from approximately 90% to approximately 80% by weight of a final mixture to be hereinbelow described. The coating material and the mixture aforesaid are automatically mixed together, as by a centrifugal mixture or stirrer, and with such homogenity that each particle is completely coated with a coating of calcium carbonate, calcium carbonate in excess of that comprised in the coating being mixed with the cottonseed meal and marrow fat absorbed therein. Such mixture should thereby occupy in volume a space or volume substantially equal to the space occupied by the bone particles and their calcium carbonate coatings.

When the mixture including the individually coated particles is complete it is placed in polyethylene bags which are sealed and thereafter the bags are treated for approximately 30 minutes in a chamber so that pressurized ethylene oxide gas may be forced to penetrate the bag to remain therein to serve as an inhibitor of the growth of bacteria and/or fungus while the bags of poultry food supplement are in storage or while they are being handled prior to being opened and the contents thereof fed to poultry.

It has been found by experiment that such a poultry food supplement may be fed to young chickens in amounts averaging one gram per chicken per day with the most beneficial results.

As is well known, chickens or other fowls, due to a diet deficiency, will peck or bite each other in order to obtain small bits of flesh which by instinct a fowl must feel it needs to compensate for the lack of some ingredient which it otherwise does not receive in normal feeding. For example, 60 young chickens, crosses between White Rock and Rock Cornish were employed. Thirty of these young chickens were placed in one pen and the other thirty were placed in another pen, and the two groups were observed for approximately seven weeks. At the beginning of the period the average weight per chick for each group was less than 5 ounces. One group was fed the bone mixture hereinabove described at the rate of approximately one gram per chick per day throughout the seven week period while the other group was not fed any bone material supplement. Both groups however were otherwise fed the same amount of conventional types of poultry feed. At the end of two weeks no evidence of cannibalism was apparent in the bone fed group and the average weight had increased to 8 ounces whereas cannibalism was observed in the group which had not been fed the bone supplement, one chick had died, and the average weight of the remaining chicks was 7.2 ounces. Two weeks later the average weight of the bone fed group had increased to 24.5 ounces and no evidence of cannibalism could be observed, however, one chick in this group died due to other causes.

As for the group not fed the bone supplement, its weight had increased to 22.3 ounces where much evidence of cannibalism was apparent. Later, at the end of the seven week test period, the average weight of the bone fed group was 3½ pounds with no results of cannibalism being observed, whereas at the end of this same period the group which had not been fed the bone supplement averaged 2 pounds 10 ounces in weight and much evidence of cannibalism was apparent.

As a second specific example, at the end of a seven week period during which time one group of 30 chicks had been fed the bone supplement at the rate of one gram per chick per day and during which period another control group of 30 chicks had not been fed the bone supplement, but during which period both groups had been fed the normal amount of other conventional poultry feed, samples or check tests were taken. Such consisted of observing and weighing a representative pullet and a representative rooster from the group which had not been fed the bone supplement with the result that such representative or average pullet weighed 2½ pounds while the representative rooster weighed 3¼ pounds. On the other hand a representative pullet taken from the bone fed group weighed 3¼ pounds and a representative rooster taken from such group weighed 4¼ pounds.

The provision of such a poultry feed supplement achieves an important dual purpose in that it serves as an anabolism stimulator to speed up the growth of poultry during the period when growth might ordinarily be at a somewhat slower rate. As a consequence poultry thus arrives at a stage approaching maturity and at such stage is heavier in weight and larger in frame and thus has greater value as food.

The feed supplement may be fed with beneficail results to birds other than to poultry, and to other animals. The bone particles being substantially white in appearance and of size to attract attention, when fed with the surrounding mix, and with conventional feeds, the result is that the fowls to which it is fed will instinctively pick up the bone particles first, insuring that full consumption of this important ingredient is always accomplished. As swallowed, the $CaCO_3$ coated particles deposit in the gizzards of the fowls as abrasives and otherwise to abet digestion.

The invention is not limited to any particular liposcopic material but rather any such material which will absorb fat and which also has food value may be employed. Also any particular coating material other than calcium carbonate may be employed as long as it can serve to properly coat each particle of bone whereby to seal in and preserve the nutritive, abrasive and other beneficial qualites thereof. Also the invention is not limited to any particular usage of specified mechanisms to accomplish the reduction of the bone to particle size, but rather any suitable liposcopic material, coating material and means and method of effecting bone reduction to particle size may be employed as long as such falls within the broad spirit of the invention and within the broad scope of interpretation claimed for and merited by the appended claim.

What is claimed is:

The process of preparing a growth stimulator poultry feed supplement comprising the steps of obtaining freshly butchered bovine bone, slicing the bone into strips of approximately ½″ width by ¼″ thickness, extruding the strips to particle size through approximately ¼″ diameter perforations, mixing the bovine bone particles, including the bovine bone marrow fat in the particles and carried along therein, with a cottonseed meal liposcopic material in proportions by weight of one proportion cottonseed meal and nine proportions of bone and marrow fat whereby the cottonseed meal absorbs marrow fat and swells to a volume substantially equal to the bone volume, and adding calcium carbonate from 10% to 20% by weight, respectively, to from 90% to 80% by weight of bone, marrow fat and cottonseed meal, and mixing the calcium carbonate with the bone, marrow fat, and cottonseed meal in substantial degree so that the particles are individually coated with calcium carbonate coatings with excess calcium carbonate being absorbed by the cottonseed meal which has also absorbed marrow fat.

References Cited by the Examiner

UNITED STATES PATENTS

| | | | |
|---|---|---|---|
| 2,152,438 | 3/1939 | McHan | 99—4 |
| 2,511,987 | 6/1950 | Mrak et al. | 99—225 X |
| 2,593,577 | 4/1952 | Lewis | 99—4 |
| 2,622,027 | 12/1952 | Torr | 99—4 X |
| 2,841,496 | 7/1958 | Brockman | 99—2 |
| 2,986,468 | 5/1961 | Edwards | 99—4 |

A. LOUIS MONACELL, *Primary Examiner.*

DANIEL J. DONOVAN, *Assistant Examiner.*